US012753643B2

(12) United States Patent
Pettengill

(10) Patent No.: US 12,753,643 B2
(45) Date of Patent: Oct. 6, 2026

(54) LATCH FOR A MOTOR VEHICLE, IN PARTICULAR AN ELECTRICALLY OPERABLE MOTOR VEHICLE LATCH

(71) Applicant: Kiekert Aktiengesellschaft, Heiligenhaus (DE)

(72) Inventor: Robert S. Pettengill, Farmington, MI (US)

(73) Assignee: Kiekert Aktiengesellschaft, Heiligenhaus (DE)

(*) Notice: Subject to any disclaimer, the term of this patent is extended or adjusted under 35 U.S.C. 154(b) by 0 days.

(21) Appl. No.: 19/064,853

(22) Filed: Feb. 27, 2025

(65) Prior Publication Data

US 2026/0250989 A1 Aug. 27, 2026

(51) Int. Cl.
*E05B 81/16* (2014.01)
*E05B 81/04* (2014.01)

(52) U.S. Cl.
CPC .............. *E05B 81/16* (2013.01); *E05B 81/04* (2013.01)

(58) Field of Classification Search
CPC .......... E05B 81/04; E05B 81/16; E05B 81/14; E05B 79/10; E05B 85/26; E05B 15/0046; Y10T 292/1075; Y10T 292/225; Y10T 292/28; Y10T 292/297; Y10T 292/296; Y10T 292/305
See application file for complete search history.

(56) References Cited

U.S. PATENT DOCUMENTS

| | | | | |
|---|---|---|---|---|
| 3,565,476 A * | 2/1971 | Berman | E05B 47/0607 292/201 |
| 6,209,932 B1 * | 4/2001 | Jung | E05B 85/26 292/216 |
| 7,532,098 B2 * | 5/2009 | Spurr | H01H 51/22 335/229 |
| 9,732,544 B2 * | 8/2017 | Wittelsbuerger | E05B 77/06 |
| 9,765,554 B2 * | 9/2017 | Cumbo | E05B 81/70 |
| 10,745,948 B2 * | 8/2020 | Cumbo | E05B 85/26 |
| 11,214,989 B2 * | 1/2022 | Dragon | E05B 77/04 |
| 11,933,083 B2 * | 3/2024 | Reusch | E05B 85/26 |
| 11,952,806 B2 * | 4/2024 | Hunt | E05B 81/16 |
| 11,993,963 B2 * | 5/2024 | Inan | E05B 81/16 |
| 12,065,862 B2 * | 8/2024 | Inan | E05B 85/243 |

(Continued)

FOREIGN PATENT DOCUMENTS

| | | | |
|---|---|---|---|
| CN | 112601870 A * | 4/2021 | E05B 17/007 |
| CN | 112867838 A | 5/2021 | |

(Continued)

OTHER PUBLICATIONS

WO2020083435 Espacenet machine translation claims and description (Year: 2026).*

*Primary Examiner* — Steven A Tullia
(74) *Attorney, Agent, or Firm* — Renner, Otto, Boisselle & Sklar, LLP

(57) ABSTRACT

The invention relates to a latch for a motor vehicle, in particular an electrically operable motor vehicle latch, comprising a locking mechanism having a catch and at least one pawl, it being possible to ratchet the catch in at least one ratchet position by means of the pawl, and a ratchet element located between the catch and the pawl in the engagement region and pivotably arranged on the catch, it being possible to allow a locked locking mechanism to be unlocked by indirectly operating the paw.

17 Claims, 2 Drawing Sheets

(56) References Cited

U.S. PATENT DOCUMENTS

| | | | | |
|---|---|---|---|---|
| 12,252,911 | B2 * | 3/2025 | Hunt | E05B 77/36 |
| 12,276,139 | B2 * | 4/2025 | Janssen | E05B 81/20 |
| 12,448,821 | B2 * | 10/2025 | Graute | E05B 15/04 |
| 2003/0014835 | A1 * | 1/2003 | Dimig | E05B 85/16 |
| | | | | 16/110.1 |
| 2004/0227358 | A1 * | 11/2004 | Kachouh | E05B 81/14 |
| | | | | 292/216 |
| 2024/0410207 | A1 * | 12/2024 | Tomaszewski | E05B 79/20 |

FOREIGN PATENT DOCUMENTS

| | | | | | |
|---|---|---|---|---|---|
| CN | 115492469 | A | * | 12/2022 | E05B 15/04 |
| DE | 10240003 | A1 | * | 3/2004 | E05B 81/16 |
| DE | 102004040157 | B3 | * | 7/2006 | E05B 81/20 |
| DE | 102009042061 | A1 | * | 4/2011 | E05B 83/16 |
| DE | 102012024303 | A1 | | 6/2014 | |
| DE | 102013110201 | A1 | * | 3/2015 | E05B 79/20 |
| DE | 102014006118 | A1 | | 10/2015 | |
| DE | 102018116406 | A1 | | 1/2020 | |
| DE | 102018123293 | A1 | * | 3/2020 | E05B 77/36 |
| DE | 102018123895 | A1 | * | 4/2020 | E05B 85/26 |
| DE | 102019123825 | A1 | | 3/2021 | |
| EP | 1619328 | B1 | * | 8/2007 | E05B 81/06 |
| FR | 2874956 | A1 | * | 3/2006 | E05B 77/08 |
| GB | 1248729 | A | * | 10/1971 | E05B 83/16 |
| KR | 102824369 | B1 | * | 6/2025 | E05B 85/243 |
| WO | WO-9804800 | A1 | * | 2/1998 | E05B 85/26 |
| WO | WO-2018046043 | A1 | * | 3/2018 | E05B 81/15 |
| WO | WO-2018196907 | A1 | * | 11/2018 | E05B 85/20 |
| WO | WO-2020083435 | A1 | * | 4/2020 | E05B 85/26 |
| WO | WO-2021043368 | A1 | * | 3/2021 | E05B 77/40 |
| WO | WO-2023036368 | A1 | * | 3/2023 | E05B 85/26 |
| WO | WO-2025008023 | A1 | * | 1/2025 | E05B 77/40 |

* cited by examiner

LATCH FOR A MOTOR VEHICLE, IN PARTICULAR AN ELECTRICALLY OPERABLE MOTOR VEHICLE LATCH

FIELD OF DISCLOSURE

The invention relates to a latch for a motor vehicle, in particular an electrically operable latch, comprising a locking mechanism having a catch and at least one pawl, it being possible to ratchet the catch in at least one main ratchet position by means of the pawl, and a further ratchet element located between the catch and the pawl in the engagement region and arranged on the catch, the ratchet element being pivotably accommodated in the catch.

BACKGROUND OF DISCLOSURE

The demands on modern motor vehicles and in particular the demands on comfort with regard to usability are constantly increasing. It is an aim of the automotive industry to provide easy-opening locking systems for doors, tailgates or hoods for the operator of the motor vehicle. The locking mechanism arranged in the vehicle latch has a decisive influence on the noise behavior and the haptics when a door or tailgate is opened.

A locking mechanism consists of a catch and a pawl, which can be moved into a ratcheted position in conjunction with a generally stationary latch holder. If, consequently, an open locking mechanism is moved in the direction of a latch holder, the catch moves into a locking position and is finally ratcheted in a locking or ratchet position by means of the pawl. There are locking mechanisms having one or two ratchet positions, i.e., a pre-ratchet position and a main ratchet position, and there are locking mechanisms that are equipped with one, two or more pawls in order to implement one or two ratchet positions in the locking mechanism. The acoustic behavior of the locking mechanism is significantly influenced by the engagement region between the catch and the pawl, with surface properties, forces and arrangements of the locking mechanism parts with respect to one another being able to influence the noise behavior.

To improve the noise behavior, a locking mechanism has become known from DE 10 2012 024 303 A1 in which components, known as puzzle blocks, are arranged in the engagement region between the catch and the pawl and can be made of different materials and/or can be provided with different surface structures. The components used in the locking parts can for example be made of a material that improves the tribological behavior of the friction partners and thus supports a noise reduction when the locking mechanism parts slide apart. In addition, it is disclosed that the alignment of surface grooves between the friction partners makes it possible to release the locking mechanism easily and with little noise.

Another locking system with a solution for easy opening of the locking mechanism is known from DE 10 2014 006 118 A1. In an exemplary embodiment, the document describes the arrangement of two pawls in engagement with the catch, the pawls differing by way of a structural arrangement with respect to the catch. In locking mechanisms, reference is also made to an opening or closing or neutral moment. In the case of a closing moment, the force vector introduced into the pawl by the catch causes the locking mechanism to be forced into a closed position. In contrast to this, in the case of a locking mechanism with an opening moment, a moment is generated that pushes the pawl out of the engagement region with the catch. The document discloses a solution which is intended to achieve easy and quiet opening of a locking mechanism. First, a closing pawl is moved out of the engagement region with the catch, as a result of which a pawl comes into engagement with the catch with an opening moment. The combined interaction of the pawls with the catch can provide a latch that opens quietly.

The solutions known from the state of the art for achieving a latch that is quiet or easy to open offer good approaches, but are in need of improvement. This is where the invention starts.

The object of the invention is to provide a latch that can be opened easily and a locking mechanism for a latch, so that safe, quiet and low-noise unlocking of the locking mechanism can be ensured even in extreme situations. This relates in particular to the fact that the locking mechanism and its properties are to be designed in such a way that the locking mechanism can also be unlatched at any time by means of an electric drive.

SUMMARY OF DISCLOSURE

The object of the invention is to provide an improved latch, in particular an improved locking mechanism for a latch of a motor vehicle. In particular, the object of the invention is to provide a structurally favorable and inexpensive possibility for achieving a locking system that is easy to open and acts quietly.

The object is achieved by the features of independent claim 1. Advantageous embodiments of the invention are specified in the dependent claims. It should be noted that the embodiments described below are not limiting; rather, any possible variations of the features described in the description and the dependent claims are possible.

According to claim 1, the object of the invention is achieved in that a latch for a motor vehicle, in particular an electrically operable latch, is provided, comprising a locking mechanism having a catch and at least one pawl, it being possible to ratchet the catch in at least one main ratchet position by means of the pawl, and a further ratchet element located between the catch and the pawl in the engagement region and arranged on the catch, the ratchet element being pivotably accommodated in the catch and it being possible to allow a locked locking mechanism to be unlocked by indirectly operating the pawl.

The construction of the motor vehicle latch according to the invention now makes it possible to provide a motor vehicle latch that is easy to open, the motor vehicle latch having a structurally simplified design. In particular, the indirect operation of the locked locking mechanism independently of the normally used release lever, which acts directly on the pawl, the pawl can be operated indirectly here. Indirectly operating the pawl has the advantage that, on the one hand, more structural freedom is gained and, on the other hand, the locking mechanism can be unlocked with less effort. The indirect transmission can provide a transmission ratio, it being possible to use the transmission ratio in a positive sense to set a favorable lever ratio for operating the pawl. The locked locking mechanism is thus indirectly unlocked, the pawl being indirectly moved to an open position. Preferably, the locking mechanism is in a main ratchet position in a position in which there is a closing moment in the pawl. From this position, the pawl must be moved beyond the neutral position to an opening moment. In a corresponding embodiment, however, a neutral moment can also be present in the pawl, it being possible for additional means, such as a pawl spring, to allow secure closing of the locking mechanism.

During closing of the locking mechanism, the catch comes into engagement with a latch holder, the catch being moved into a ratchet position, for example a pre-ratchet position and a main ratchet position, through the relative movement of the latch holder and catch. It is also possible here for the catch to be moved into an overtravel position that goes beyond the main ratchet position, so that it is possible for the pawl to fall safely into the catch.

During this closing process, a door seal, for example, is compressed, creating a force that is transmitted to the locking mechanism via the latch holder. This closing force must be absorbed by the locking mechanism during operation of the motor vehicle. In extreme situations, such as an accident, extreme loads or forces can act on the locking mechanism. Even in these extreme situations, the locking mechanism must securely fix the latch holder. During opening of the locking mechanism, the above-mentioned forces act on the locking mechanism, with the ratchet element on the catch relieving the locking mechanism by pivoting the locking mechanism parts to one another without the locking mechanism parts disengaging, as a result of which a peak load on the locking mechanism can be accommodated by the ratchet element arranged pivotably in the catch. The rotating or pivoting movement of the ratchet element thus has a relieving effect on the locking mechanism, so that there is less force between the locking mechanism components in a subsequent disengagement of the pawl and the ratchet element. This can achieve easier but also quieter unlatching of the locking mechanism.

When reference is made to a motor vehicle lock in the sense of the invention, this includes motor vehicle locks which are used, e.g., in side doors, sliding doors, flaps, hoods, and/or covers, even where pivotably- or slidably-mounted components are arranged on the motor vehicle. It is also conceivable that the motor vehicle latch is arranged in a backrest of a seat or is used as a floor latch for a removable seat, to name just a few application examples.

The construction of the motor vehicle latch according to the invention now makes it possible to provide a motor vehicle latch that is easy to open, wherein the motor vehicle latch has a structurally simplified design. In particular, the indirect operation of the locked locking mechanism independently of the normally used release lever, which acts directly on the pawl, the pawl can be operated indirectly here. Indirectly operating the pawl has the advantage that, on the one hand, more structural freedom is gained and, on the other hand, the locking mechanism can be unlocked with less effort. The indirect transmission can provide a transmission ratio, it being possible to use the transmission ratio in a positive sense to set a favorable lever ratio for operating the pawl. The locked locking mechanism is thus indirectly unlocked, the pawl being indirectly moved to an open position. Preferably, the locking mechanism is in a main ratchet position in a position in which there is a closing moment in the pawl. From this position, the pawl must be moved beyond the neutral position to an opening moment. In a corresponding embodiment, however, a neutral moment can also be present in the pawl, it being possible for additional means, such as a pawl spring, to allow secure closing of the locking mechanism.

In continuation of the inventive concept, the ratchet element can be operated for unlocking. The locking mechanism can be unlocked indirectly: by applying force to the ratchet element, the pawl can be moved out of the ratchet position. The pawl is therefore moved indirectly by introducing force into the ratchet element. The ratchet element is moved against the pawl so that the pawl moves to an unlocked position and thus away from the catch or the ratchet element. The ratchet element consequently moves the pawl to the release position. The ratchet element itself is pivotably accommodated in the catch. In this case, the ratchet element is able to roll along the pawl. The rolling or rolling movement of the ratchet element results in the main load between the catch and the pawl being reduced, the ratchet element being released from the pawl following the rolling movement. The ratchet element is released from the pawl at a time when the main load has already been removed, so that the locking mechanism can be unlocked easily and preferably quietly. A major advantage here is that only small forces are required during the rolling movement to initiate unlocking. This is particularly advantageous when the locking mechanism is unlocked electrically.

In a further development of the invention, the ratchet element can be operated by means of a coupling lever. The ratchet element is pivotably accommodated in the catch and preferably causes an overall closing moment in the locking mechanism. In other words, in the main ratchet position of the locking mechanism, the end position of the ratchet element is designed in such a way that, in interaction with the pawl, a closing moment is created in the locking mechanism. According to the invention, a coupling lever can act on the ratchet element. The coupling lever can be pivotably accommodated in the housing and/or a reinforcement plate and/or in the latch case. The coupling lever itself then acts on the ratchet element, the ratchet element performing the pivoting movement described above in order to unlock the locking mechanism.

In one embodiment, the coupling lever can be operated electrically. The motor vehicle latch according to the invention is particularly suitable for electrical unlocking. The construction with the ratchet element pivotably mounted in the catch allows the locking mechanism to be easily unlocked because the main ratchet between the pawl and catch or the pawl and ratchet element does not have to be separated abruptly, which results in a great deal of force, but rather the unlocking takes place as part of a rolling movement between the pawl and the ratchet element, the ratchet element performing a pivoting movement in the bearing point of the catch. The overall pivoting movement of the ratchet element, combined with the rolling on the pawl, allows easy unlocking, i.e. unlocking with little force, so that the motor vehicle latch as a whole is suitable for electrical unlocking. Advantageously, a gear ratio can also be or become set by means of the coupling lever, so that unlocking can be initiated using a small and therefore inexpensive electric motor. The coupling lever is preferably pivotably accommodated in the motor vehicle latch, but can alternatively also perform a linear movement to operate the ratchet element.

As already mentioned above, the coupling lever can be mounted in the motor vehicle latch housing and/or in a reinforcement plate and/or in the latch case. The coupling lever provides a way to move the ratchet element. The coupling lever is thus an operating means for pivoting the ratchet element and consequently unlocks the locking mechanism. Depending on the construction of the motor vehicle latch and the position of the pawl and catch in relation to each other, an arrangement of the coupling lever in the motor vehicle latch can be advantageous. Because only small forces are required to unlock the locking mechanism, it is also conceivable to mount the coupling lever exclusively in the motor vehicle latch housing made of plastics material. In order to be able to absorb correspondingly larger forces or to be able to introduce larger forces into the ratchet element, an additional bearing in a reinforcement plate, for example, can be advantageous. Larger forces can occur, for example, if an accident causes the locking mechanism in, for example, a side door of a motor vehicle to become jammed. In order to allow the locking mechanism to be opened safely in this case too, an additional stabilizing bearing for the coupling lever can be advantageous.

In continuation of the inventive concept, the coupling lever can be operated by means of a pivotably mounted operating lever. The operating lever in the motor vehicle latch can be driven, for example, by means of an electric motor drive. The operating lever itself can have a toothing that engages, for example, with a drive wheel of an electric motor. Depending on the construction of the motor vehicle latch and the necessary operating time and/or operating force, a gear or a plurality of gear stages can also be arranged between the operating lever and the electric motor. The operating lever itself is preferably pivotably accommodated in the motor vehicle latch. Consequently, if the operating lever is driven by an electric motor, the operating lever operates the coupling lever, which in turn preferably acts on the ratchet element by means of a pivoting movement. The ratchet element itself experiences a force by means of which the unlocking process described above can be initiated.

If the operating lever can be mounted on a locking mechanism part shaft, in particular on the catch shaft, this results in an advantageous embodiment of the invention. In order to ensure a compact construction of the latch according to the invention and to reduce the number of components required in the motor vehicle latch, it has proven advantageous if the operating lever can be mounted on a locking mechanism part shaft. The locking mechanism parts catch and pawl are usually accommodated in the latch case of the motor vehicle latch. It is necessary to accommodate the motor vehicle latch in the metal latch case because the locking mechanism components must maintain the ratchet position even in extreme situations, such as an accident. In order to be able to absorb these high forces, the locking mechanism parts are mounted in metal shafts in the latch case and can be additionally secured by a reinforcement plate. The reinforcement plate connects at least the locking mechanism part shafts to each other so that a supporting structure consisting of a latch case, locking mechanism part shafts and a reinforcement plate can be provided for the locking mechanism parts. According to the invention, the existing locking mechanism part shaft can be used to support the operating lever. The preferable mounting of the operating lever on the catch shaft allows favorable engagement conditions and a favorable positioning of the coupling lever in relation to the ratchet element to be set.

If the coupling lever can be pre-tensioned in the direction of the operating lever, in particular by means of a leg spring, this results in a further embodiment of the invention. The coupling lever engages the ratchet element and operates the ratchet element to unlock the locking mechanism. On the other hand, the coupling lever is also attached to the operating lever and can be moved by means of the operating lever. In the interaction between the pawl and the ratchet element, the rolling movements and the forces introduced play a major role in unlocking the locking mechanism. After unlocking, the ratchet element itself can be moved back to its original position by means of a spring element. Preferably, the ratchet element can be pre-tensioned into a closed position, i.e. a position in contact with the catch. If the coupling element or the coupling lever is spring-loaded against the operating lever, the operating lever can provide a control cam for the movement of the coupling lever. The coupling lever itself is fixedly accommodated in the housing of the motor vehicle latch. By moving the operating lever, a pivoting movement can be initiated in the coupling lever and, depending on the position of the locking mechanism, the ratchet element can be moved. In the interaction between the operating lever and the coupling lever, an appropriate control cam and a moment to be introduced into the coupling lever can be adjustable. Thus, for each movement of the coupling lever and thus of the ratchet element, sufficient force can be provided to unlock the locking mechanism.

If the operating lever has a control contour for operating the coupling lever, the possibility described above of being able to set a movement sequence in the motor vehicle latch arises. In addition to controlling the movement sequence of the coupling lever and thus of the ratchet element, the control cam can also provide a transmission ratio that can be used to meet the individual requirements in the motor vehicle latch. The use of the ratchet element makes the motor vehicle latch suitable for being opened electrically. On the other hand, an extreme situation must also be considered in which unlocking the locking mechanism is made more difficult. If, for example, in the event of an accident, a motor vehicle door is deformed with the motor vehicle latch according to the invention, high forces or tensions can occur in the motor vehicle latch. On the one hand, it must be ensured that the locking mechanism remains locked even in extreme situations in order to prevent the motor vehicle latch from being opened accidentally, and on the other hand, it must be possible to open the door element afterwards in order to be able to leave the vehicle or, for example, to rescue injured people. By means of an appropriately set control contour on the operating lever, on the one hand it is possible to provide electrical opening and, on the other hand, by adjusting a transmission ratio accordingly, it is also possible to provide a force that makes it possible to open the motor vehicle latch in an extreme situation. It is also conceivable that, in addition to the electrical opening of the locking mechanism, a manual opening of the locking mechanism is also possible, for example by means of a Bowden cable acting on the operating lever.

In an advantageous development of the invention, the locking mechanism can be closed by means of the operating lever. The operating lever acts on the coupling lever and causes the motor vehicle latch to open. If the operating lever is now used at the same time to close the motor vehicle latch, additional functionality can be provided with the smallest possible number of components. For example, by reversing the direction when driving the operating lever in a first direction of rotation, the coupling lever can be operated and, by driving the operating lever in an opposite direction, a closing mechanism can engage in the locking mechanism. The closing mechanism can also act on the catch and move the catch from a pre-ratchet position to a main ratchet position. The operating lever in combination with the closing mechanism and the coupling lever can provide a cost-effective motor vehicle latch equipped with the smallest possible number of components in order to allow electrical opening and closing of the motor vehicle latch with a drive element.

The inventive construction of the motor vehicle latch makes it possible to provide a high level of functionality in the motor vehicle latch with a small number of components. In addition, the alternative construction of the motor vehicle latch and indirect operation of the ratchet element can result in a compact construction of the motor vehicle latch as a whole. By moving the coupling lever and the operating lever into the region of the locking mechanism, a compact construction of the motor vehicle latch can be achieved. If a closing function is also integrated, which can also be driven with the operating lever, a high level of functionality can be provided with the smallest possible number of components and in a compact form.

BRIEF DESCRIPTION OF DRAWINGS

The invention is explained in more detail below with reference to the accompanying drawings on the basis of a preferred exemplary embodiment. However, the principle applies that the embodiment does not limit the invention, but is merely an advantageous embodiment. The features depicted can be implemented individually or in combination with further features of the description as well as what is claimed-individually or in combination.

In the figures.

DETAILED DESCRIPTION

Figure 1:
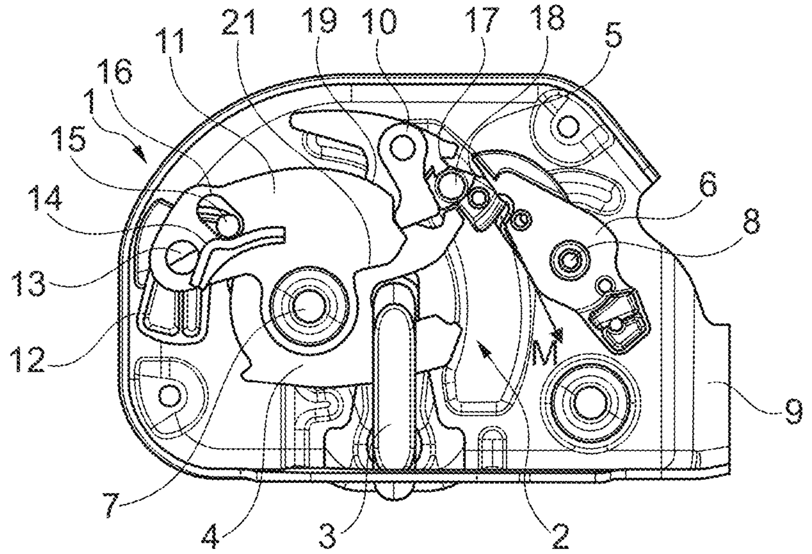
FIG. 1 is a plan view of a motor vehicle latch designed according to the invention in an open position and with the components essential for explaining the invention, a main ratchet position being shown.

FIG. 1 shows a motor vehicle latch 1 in a plan view of a locking mechanism 2 in a main ratchet position of the locking mechanism 2. The motor vehicle latch 1 is engaged with a latch holder 3, so that a state, for example of a closed tailgate, is shown. The locking mechanism 2 comprises a catch 4, a ratchet element 5, and a pawl 6. The locking mechanism components catch 4 and pawl 6 are each accommodated in a latch case 9 so as to be pivotable about a locking mechanism part shaft 7, 8.

According to the invention, the motor vehicle latch 1 is provided with a coupling lever 10, which is accommodated in a fixed and pivotable manner, for example, in a motor vehicle latch housing (not shown). The coupling lever 10 interacts with an operating lever 11. The operating lever 11, in turn, is mounted in the motor vehicle latch 1 so as to be pivotable about the locking mechanism part shaft 7 of the catch 4. In this further embodiment, the motor vehicle latch 1 is equipped with a closing function. For this purpose, a closing lever 12 is pivotably accommodated in the operating lever. A closing lever shaft 13 allows the closing lever 12 to move. The movement of the closing lever 12 is controlled via a control contour 14. For this purpose, a bolt-like extension 15 extends through an opening 16 in the operating lever 11 so that the closing pawl can be operated via the control contour 14.

FIG. 1 shows the main ratchet position of the motor vehicle latch 1. Overall, the locking mechanism 2 assumes a position in which a closing moment M is generated in the locking mechanism 2. A force vector M or a closing moment M illustrates the position of the closing force in the locking mechanism 2. The ratchet element 5 is arranged between the catch 4 and the pawl 6, the ratchet element 5 being pivotably movable about a bearing point 17 in the catch 4. In this exemplary embodiment, the ratchet element has a cylindrical extension 18 that can be brought into engagement with the coupling lever 10. The coupling lever 10 in turn rests on a control contour 19 in a spring-loaded manner.

As already described in the introduction, FIG. 1 shows the main ratchet position and thus a closed position of a component that is movably attached to the motor vehicle and held in the closed position by means of the motor vehicle latch 1. The closing moment M allows the latch holder 3 to be held securely in the locking mechanism 2.

Figure 2:
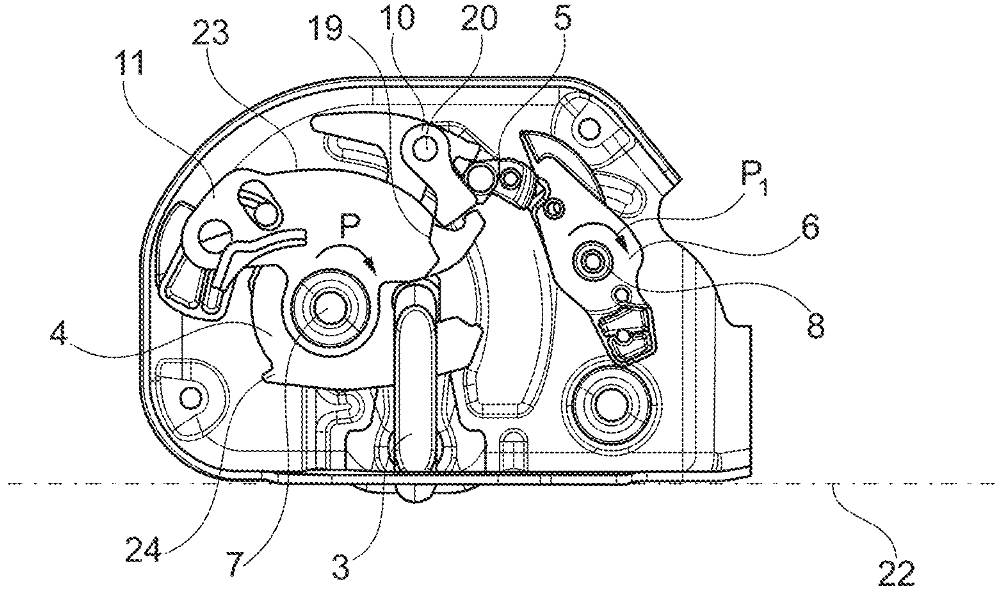
FIG. 2 is a view of the motor vehicle latch according to FIG. 1 in a partially locked position of the locking mechanism and FIG. 3 is a view of the motor vehicle latch according to FIG. 1 in an open position of a door element.

If an operator of the motor vehicle now gives an opening command to the motor vehicle, the operating lever 11 is moved clockwise in the direction of arrow P. The control contour 19 moves the coupling lever 10 about its bearing point 20 in a counterclockwise direction so that the coupling lever 10 engages with the cylindrical extension 18. The movement of the ratchet element 5 in the bearing point 17 of the catch 4 causes a rolling movement to occur between the ratchet element 5 and the pawl 6. The pawl 6 is pivoted about the bearing point 8 in the direction of the arrow P1, which simultaneously causes an opening movement of the catch in the direction of the arrow P. The high initial load present in the locking mechanism 2 is consequently reduced in regions by the rolling movement between the ratchet element and the pawl, the reduction of the high load in the locking mechanism taking place during the rolling movement. Only after part of the load on the locking mechanism 2 has been removed does the pawl disengage from the ratchet element. This allows easy opening, so that only small forces or moments are required to unlock the locking mechanism 2. The compact structure of the unlocking mechanism consisting of the operating lever 11 and the coupling lever 10 can be clearly seen in FIG. 2. The operating lever 11 is accommodated in the locking mechanism part shaft 7 and the coupling lever 10 is mounted in a movement range of the catch 4 in the motor vehicle latch 1. Consequently, a compact construction can be combined with the advantages of indirectly unlocking the locking mechanism.

Figure 3:
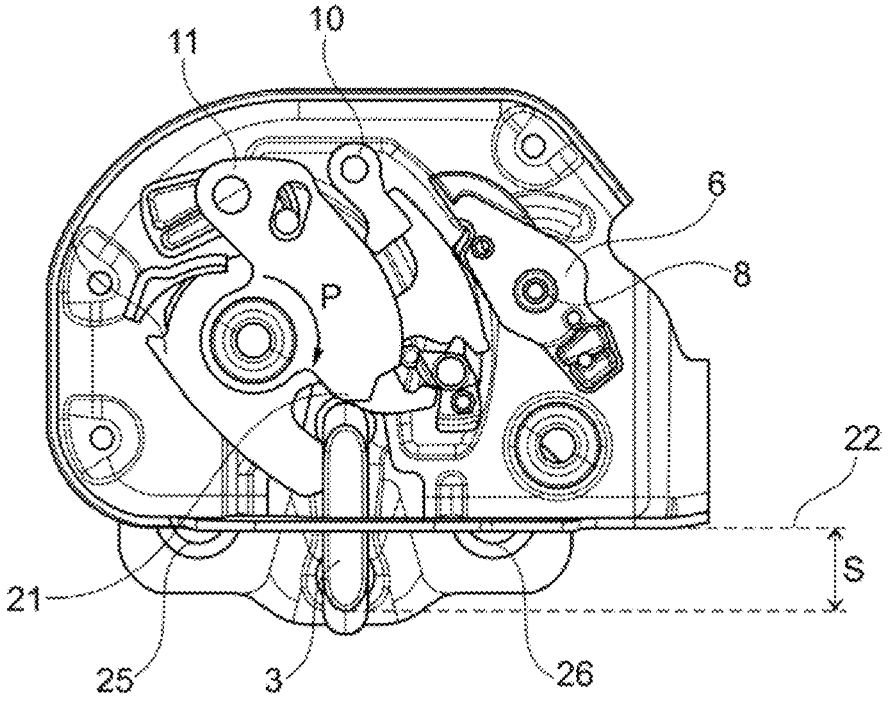

In continuation of the inventive concept, the functionality of the motor vehicle latch can be further increased in that, when the operating lever 11 is moved further in the direction of the arrow P, the operating lever 11 serves as a support for a door element 22, as shown in FIG. 3. A contact surface 21 on the operating lever 11 serves as a means for supporting the door element 22. By means of the operating lever 11, the door element 22 can be moved relative to the latch holder 3 by further moving the operating lever 11 about the shaft 7 in the direction of the arrow P. The operating lever 21 therefore functions as a support in the motor vehicle latch 1. The operating lever 11 thus has an additional function, so that the operating lever 11 can also be referred to as a multifunctional lever 11.

Even if no electric drive for the operating lever 11 is shown here for reasons of clarity, it is nevertheless conceivable, for example, that a toothing is attached in the contour region 23 of the operating lever 11, into which, for example, a gear of an electric drive engages and moves the operating lever 11 in the direction of the arrow P. However, a drive for the operating lever 11 can also be installed, for example, on the shaft 7 itself or act as an external drive, for example by means of a Bowden cable on the operating lever 11.

To further increase the functionality of the motor vehicle latch 1 shown, it is also conceivable that by moving the operating lever 11 clockwise about the shaft 7, the operating lever 11 also functions as a closing mechanism in the motor vehicle latch 1. For this purpose, the closing lever 12 interacts with the control contour 14, whereby the closing lever 12 engages with a stop surface 24 on the catch 4 and can thus transfer the catch 4 from a pre-ratchet position to a main ratchet position.

LIST OF REFERENCE SIGNS

1 Motor vehicle latch
2 Locking mechanism
3 Latch holder
4 Catch
5 Ratchet element
6 Pawl
7, 8 Locking mechanism part shaft
9 Latch case
10 Coupling lever
11 Operating lever
12 Closing lever
13 Closing lever shaft
14, 19 Control contour
19 Bolt
16 Opening
17, 20 Bearing point
18 Cylindrical extension
21 Contact surface
22 Door element
23 Contour region
24 Stop surface
M Moment, force
P, P1 Arrow

The invention claimed is:

1. A latch for a motor vehicle, the latch comprising:
a locking mechanism having a catch and at least one pawl with an engagement region between the catch and the at least one pawl,
wherein the locking mechanism is configured to ratchet the catch in at least one ratchet position by the pawl,
a ratchet element located between the catch and the at least one pawl in the engagement region and arranged on the catch,
a coupling lever, and
at least one of a motor vehicle latch housing, a latch case, and a reinforcing plate,
wherein the ratchet element is pivotably accommodated in the catch,
wherein the pawl is configured to be indirectly operable to unlock a locked locking mechanism,
wherein the coupling lever directly acts on the ratchet element, and
wherein the coupling lever is pivotably mounted on the motor vehicle latch housing, the latch case, or the reinforcing plate.

2. The latch according to claim 1, wherein the ratchet element is operable for unlocking.

3. The latch according to claim 1, wherein the coupling lever is electrically operable.

4. The latch according to claim 1, further comprising a pivotably mounted operating lever, wherein the coupling lever is operable by the pivotably mounted operating lever.

5. The latch according to claim 4, further comprising a locking mechanism part shaft, wherein the pivotably mounted operating lever is mounted on the locking mechanism part shaft.

6. The latch according to claim 5, further comprising a catch shaft, wherein the locking mechanism part shaft is a catch shaft.

7. The latch according to claim 4, wherein the coupling lever is pretensioned in a direction of the pivotably mounted operating lever.

8. The latch according to claim 7, further comprising a leg spring, wherein the coupling lever is pretensioned by a leg spring.

9. The latch according to claim 4, wherein the pivotably mounted operating lever has a control contour for operating the coupling lever.

10. The latch according to claim 4, wherein the locking mechanism is configured to be closed by the operating lever.

11. The latch according to claim 4, wherein the coupling lever is attached to the pivotably mounted operating lever.

12. The latch according to claim 1, wherein the ratchet element is pretensioned into a closed position.

13. The latch according to claim 1, the catch and the pawl are accommodated in the latch case.

14. The latch according to claim 1, the latch case is made of metal.

15. A latch for a motor vehicle, the latch comprising:
a locking mechanism having a catch and at least one pawl with an engagement region between the catch and the at least one pawl,
wherein the locking mechanism is configured to ratchet the catch in at least one ratchet position by the pawl, and
a ratchet element located between the catch and the at least one pawl in the engagement region and arranged on the catch,
wherein the ratchet element is pivotably accommodated in the catch,
wherein the pawl is configured to be indirectly operable to unlock a locked locking mechanism,
further comprising a coupling lever, wherein the ratchet element is operable by the coupling lever,
further comprising a pivotably mounted operating lever, wherein the coupling lever is operable by the pivotably mounted operating lever, and
further comprising a locking mechanism part shaft, wherein the pivotably mounted operating lever is mounted on the locking mechanism part shaft.

16. The latch according to claim 15, further comprising a catch shaft, wherein the locking mechanism part shaft is a catch shaft.

17. A latch for a motor vehicle, the latch comprising:
a locking mechanism having a catch and at least one pawl with an engagement region between the catch and the at least one pawl,
wherein the locking mechanism is configured to ratchet the catch in at least one ratchet position by the pawl, and
a ratchet element located between the catch and the at least one pawl in the engagement region and arranged on the catch,
wherein the ratchet element is pivotably accommodated in the catch,
wherein the pawl is configured to be indirectly operable to unlock a locked locking mechanism,
further comprising a coupling lever, wherein the ratchet element is operable by the coupling lever,
further comprising a pivotably mounted operating lever, wherein the coupling lever is operable by the pivotably mounted operating lever, and
wherein the locking mechanism is configured to be closed by the operating lever.

* * * * *